Jan. 31, 1939.  F. J. HORVATH  2,145,395
PROCESS FOR MAKING CONCENTRATES
Filed May 17, 1937  3 Sheets-Sheet 1
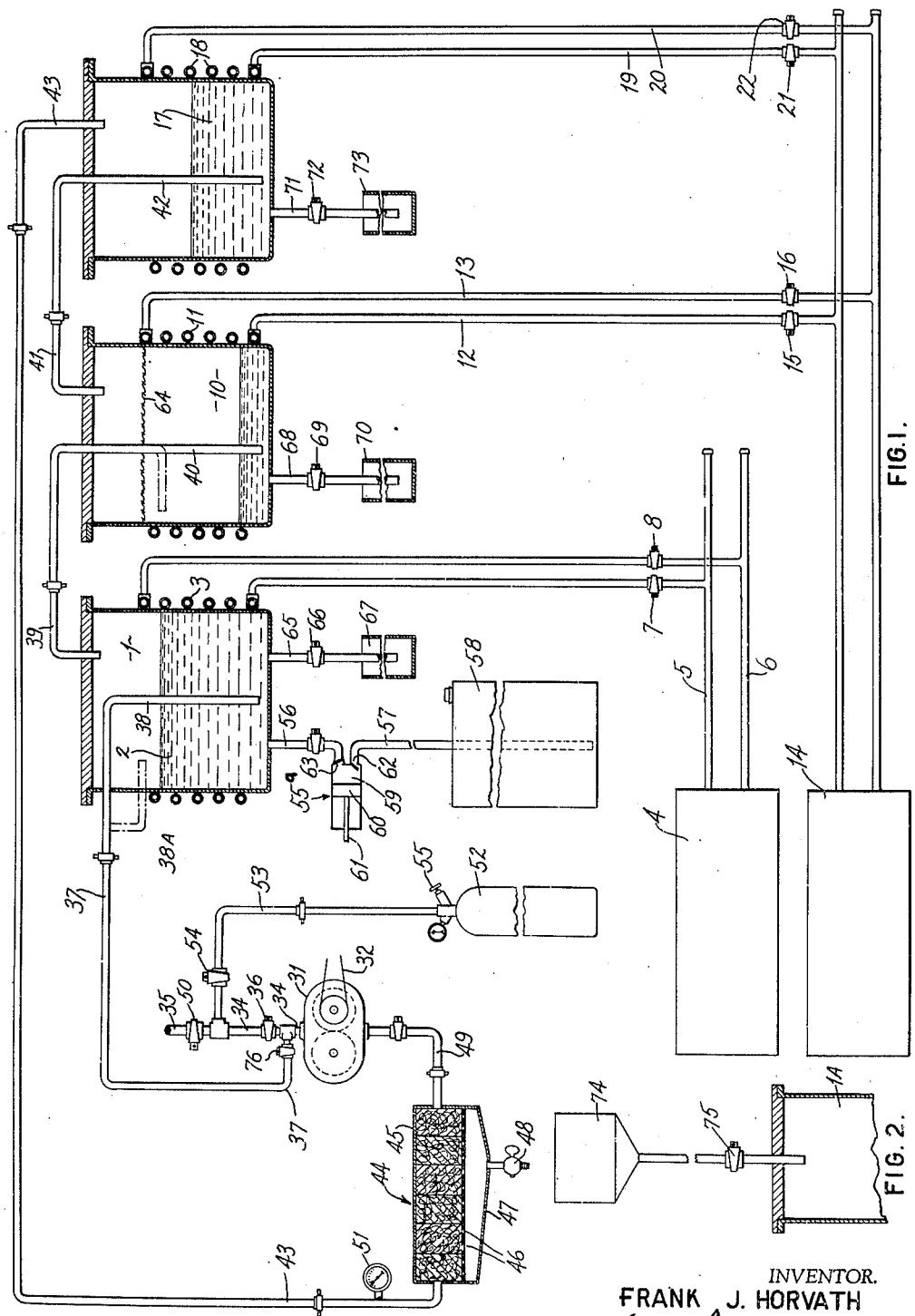
INVENTOR.
FRANK J. HORVATH
BY Harry P. Canfield
ATTORNEY.

Jan. 31, 1939.  F. J. HORVATH  2,145,395
PROCESS FOR MAKING CONCENTRATES
Filed May 17, 1937   3 Sheets-Sheet 2

INVENTOR.
FRANK J. HORVATH
BY Harry A. Canfield
ATTORNEY.

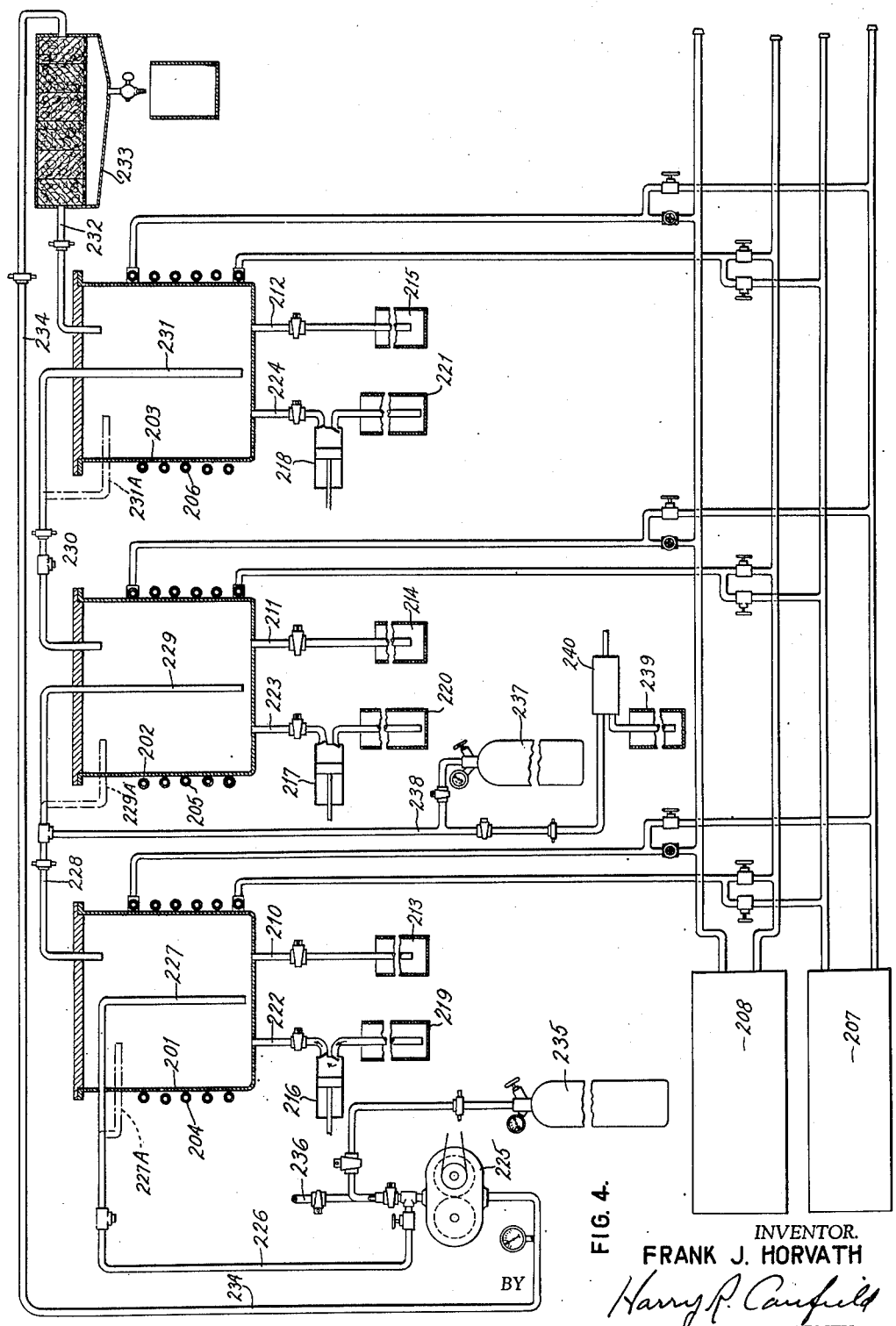

Patented Jan. 31, 1939

2,145,395

UNITED STATES PATENT OFFICE 2,145,395

PROCESS FOR MAKING CONCENTRATES

Frank J. Horvath, Cleveland, Ohio

Application May 17, 1937, Serial No. 143,195

5 Claims. (Cl. 99—71)

This invention relates to chemical processes generally, that is to say, to chemical processes for effecting the analysis of synthesis of chemical mixtures and compounds.

The primary object of this invention is to provide an improved process, and an improved apparatus for performing the same, by which changes may be made in the quantitative and qualitative relations of the components of chemical mixtures and compounds. The results of the process are hereinafter referred to generically as "actions". The following is an illustrative but incomplete list of the actions which can be carried out in an improved manner by the process: distillation, fractional distillation, hydrogenation, oxidation, reduction, extraction, purification, concentration, volatilization, dehydration, synthesis in general (both quantitative and qualitative), analysis in general (both quantitative and qualitative), colloidal synthesis, experimental physical and bio-chemistry, etc., etc.

Another and more specific object of the invention is to provide a more efficient apparatus and process for making food concentrates, including water soluble coffee beverage concentrate, fruit juice concentrates, and concentrates of other beverages and foods which in their normal state contain great bulk because of the large content of moisture.

Other objects of my invention will be apparent to those skilled in the art to which my invention appertains.

My invention is fully disclosed in the following description taken in connection with the accompanying drawings in which:

Fig. 1 is a diagrammatic view of an apparatus embodying my invention in the preferred form for making concentrate;

Fig. 2 is a view similar to a part of Fig. 1 illustrating a modification;

Fig. 4 is a view of an embodiment similar to that of Fig. 1 but for performing chemical action generally.

Figure 3:
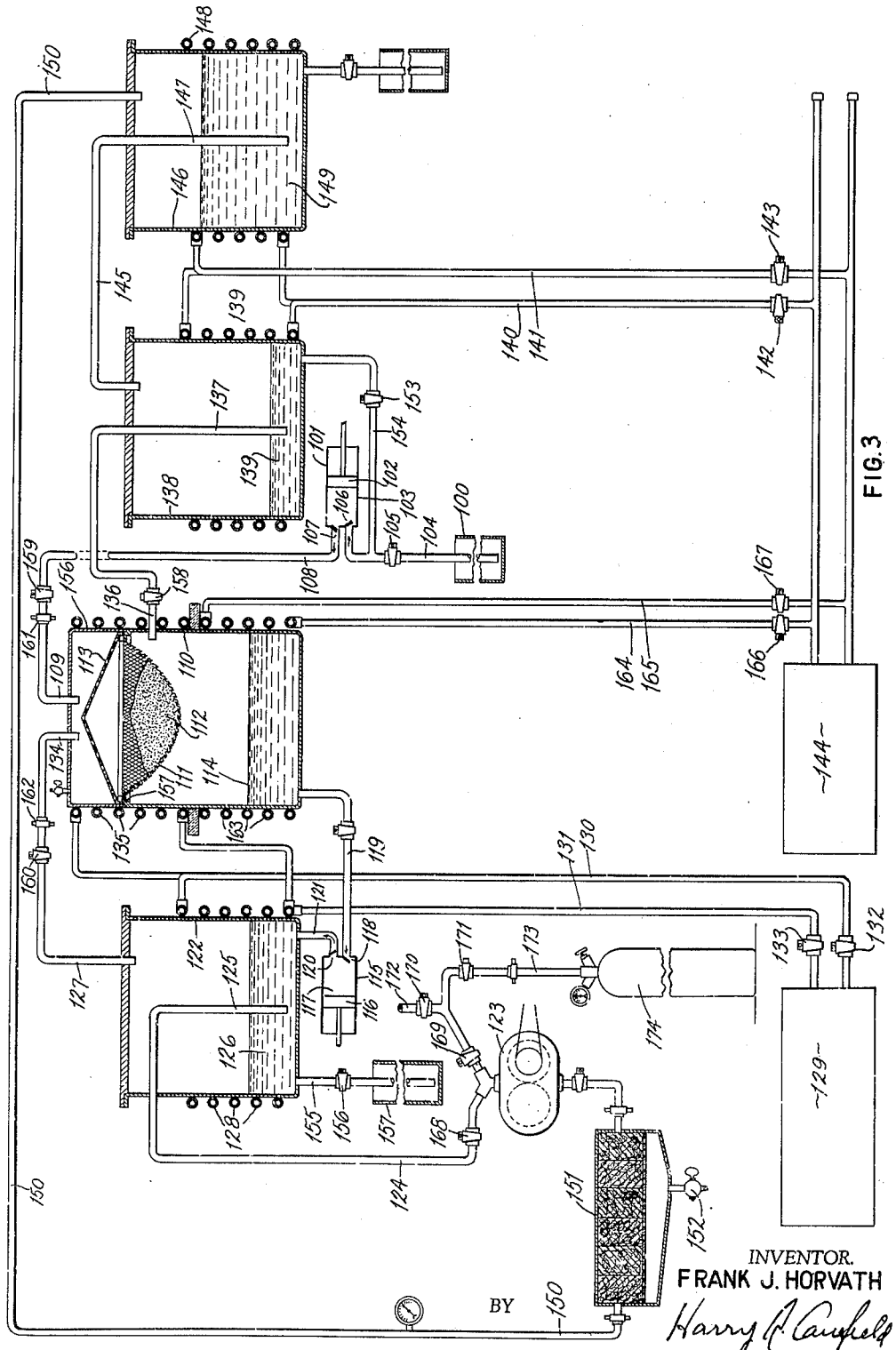
Fig. 3 is a view of an embodiment similar to that of Fig. 1 but for the specific use of making coffee beverage concentrate.

In the following description my invention will first be described as applied to the making of a food concentrate from a liquid food; and then will be described as applied to the making, specifically, of coffee beverage concentrate; and then will be described more generally as applied to .arious ones of the foregoing list of possible actions.

Referring to the drawings, Fig. 1, I have illustrated at 1 a vessel or container in which is a quantity of liquid food such, for example, as orange juice, which is to be reduced to a concentrate. The vessel 1 is surrounded by coils 3—3, through which is circulated a heating fluid, such for example, as hot water or steam. Any suitable source, such as that indicated diagrammatically at 4, may be provided to supply and circulate the hot fluid to heat the vessel 1 and the contents thereof, and conduits 5 and 6 connecting the source 4 with the coils 3 may be provided with valves 7 and 8 respectively to control the flow.

At 10 is another vessel or container surrounded by coils 11—11 which, in the particular instance under consideration, are refrigerating coils, supplied with refrigerant through conduits 12 and 13 from a source 14 of refrigerant and under control of valves 15 and 16.

At 17 is another vessel surrounded by coils 18—18 supplied with refrigerant by conduits 19 and 20 from the source 14 and controlled by valves 21 and 22.

The vessels 17, 10 and 1 and their temperature changing coils may be surrounded by insulating jackets, not shown.

It will be understood that the temperature of the vessel 17 may be controlled by opening or closing one of the valves 21 or 22 to control the rate at which the refrigerant is supplied thereto, and a similar manual control may be provided by the valves 15 and 16 for the vessel 10; and by the valves 7 and 8 for the vessel 1. Preferably the sources of heating fluid and of refrigerant 4 and 14 are well known heating or refrigerating systems which operate automatically to maintain predetermined temperatures at the vessels which they control respectively; and such systems being well known, it is deemed unnecessary to further illustrate or describe them herein.

At 31 is a pump which in the preferred practice of my invention is a positive displacement pump driven by a belt 32 from any suitable motor. The pressure side of the pump 31 communicates with a conduit 34, the outer end of which is open to the atmosphere through a nozzle 35 and which may be completely closed off by a valve 36. Between the valve 36 and the pump, the conduit 34 communicates with a conduit 37 through a valve 76. The valve 76 may be used as a regulating valve to control the rate of flow of fluid through the conduit 37 for the purposes described herein.

The conduit 37, beyond the pump, has a portion extending through the wall of the vessel 1 and terminating in a downwardly bent portion 38 in the vessel adjacent the bottom thereof. The top of the vessel 1 communicates by a conduit 39 with a downwardly extending portion 40, projecting into the vessel 10. A conduit 41 communicates with the upper part of the vessel 10 and has a portion 42 projecting into the vessel. A conduit 43 has a portion communicating with the upper portion of the vessel 17 and extending back toward the intake side of the pump 31 but preferably communicates with the pump through a filter or cleaner 44 comprising a sealed casing 45 having units or blocks of hygroscopic material therein and perforations 46 in a bottom wall of the casing through which collected condensed vapor, if any, may flow out into a receptacle 47 and be drained at will by a valve 48.

The casing 45 is sealedly connected at one end to the conduit 43 and a conduit 49 sealedly connected to it at the other end communicates with the pump 31. This device will aid in maintaining the fluid pure, to be referred to.

From the foregoing description, it will be apparent that the pump 31 is connected to a completely closed system including the conduits and conduit portions, 34, 37, 38, 39, 40, 41, 42, 43, 45 and 49 in series, so that when the pump is operated it will circulate through this system whatever medium is contained therein. In some cases this fluid medium may be air, or in other cases, it may be gases or a selection of gases and in other cases, a liquid. In the present instance in which the material operated upon is natural orange juice, the preferred fluid is nitrogen or carbon-dioxide. Assuming that the medium is nitrogen and that the said system is to be charged therewith, the following procedure to charge the system may be followed. The valve 76 is closed and the valve 36 opened and the pump 31 is started. A valve 50 is preferably used to control the nozzle 35 and it, at this time, is also opened. The pump pumps out of the system, through the nozzle 35, the air contents thereof creating a vacuum in the said system; and it is for this reason that the pump 31 is preferably a positive displacement pump.

When a suitable degree of vacuum has been obtained, which may be indicated on a gauge 51, the valve 50 is shut. A tank of nitrogen 52 is connected to the conduit 34 between the valves 36 and 50 by a conduit 53 controlled by a valve 54, normally closed. The valve 54 and the usual valve 55 on the tank 52 are opened and the system fills in the well known manner with the gas. When a suitable gas pressure is indicated on the gauge 51 which, for a reason which will appear later, is preferably somewhat above atmospheric pressure, the supply of nitrogen is cut off by the valves 54 and 55 and the valve 76 is opened so that when the pump 31 is again operated, it will circulate nitrogen through the system.

Inasmuch as it is, of course, desirable to conserve the nitrogen, means is provided to supply the original orange juice material into the vessel 1 without opening the system to the atmosphere. Any suitable means may be provided for this but the preferred method is to provide a pump indicated generally at 55a, connected by a conduit 56 to the vessel 1 and by a conduit 57 to a supply vessel 58 in which a supply of orange juice may be kept. The pump 55 is shown diagrammatically and in such diagrammatic showing comprises a cylinder 59 and a piston 60 reciprocable therein by a handle 61. Upon retracting the piston, a check valve 62 in the line of the conduit 57 opens and the charge of orange juice passes through the conduit into the cylinder 59 and a check valve 63 in the line of the conduit 56 remaining closed. When the piston 60 is reciprocated in the other direction, the check valve 62 closes and the check valve 63 opens and the charge is forced into the vessel 1 against the pressure of the gas therein. If therefore, as stated above, the gaseous pressure in the system is at atmospheric pressure, it will now be increased to substantially above atmospheric. If preferred, the orange juice may be pumped up to the upper end of the conduit 56 or even into the vessel 1 before the exhausting process, above described, is started.

The system now having a charge of gaseous medium and a charge of natural juice 2 therein, is operated in the following manner. The pump 31 is operated to continuously circulate the gaseous medium through the system and while this is continuously going on, the vessel 1 and therefore the contents 2 thereof are heated by the coils 3—3. As is well known, orange juice consists generally of a large proportion of water and a small proportion of citric acid, acetic acid, malic acid, and essential oils. Some of these constituents will break down and therefore become unnatural if subjected to temperatures considerably higher than those at which they naturally exist and therefore the contents 2 of the vessel 1 will preferably not be heated higher than 100° C.

The circulating gas is discharged into the bottom portion of the liquid mass 2 and passes upwardly therethrough and thereby becomes saturated or heavily loaded with all of the volatile constituents of the original mixture, namely moisture and the said acids and oils. And inasmuch as the gas is continually flowing out of the conduit portion 38 and upwardly through the liquid, even if each given quantity of gas carries away only a small portion of the said volatile ingredients, by its continuous action, all of the ingredients will be ultimately carried out and over through the conduit 39 into the vessel 10, in the form of loaded or saturated vapor.

The vessel 10 is refrigerated to a very low temperature by the coils 11—11, preferably not higher than 10° C. and is preferably refrigerated to this temperature before the process is started. The vapor discharged out of the conduit portion 40 into the vessel 10 therefore, is immediately chilled below the point at which the said constituents of the vapor can remain fluid and therefore they precipitate out.

In general, at a suitable low temperature, the moisture in the vapor will not crystallize, although the other constituents will, but even if the moisture or some of it should crystallize in the vessel 10, it will subsequently be picked up by the circulating medium which, as the process continues, flows into the vessel 10 with less and less moisture therein. In every case, the moisture carried by the gas and leaving the vessel 10 will flow by the conduit 41 into the vessel 17. This vessel is refrigerated by the coils 18—18 to a temperature which will, in every case, crystallize out of the gases substantially all of the moisture therein, rendering it dry, and allowing it to return in a dry state to the pump 31.

Of course, if due to any cause some of the moisture in the gas does not crystallize out in the vessel 17, another vessel such as the vessel 17 but on beyond it in the system may be employed, each one subtracting by crystallization, moisture out of the gas so that eventually it returns to the pump in a dry state.

In practice, however, I have found that a single vessel 17 is sufficient for this purpose.

The vessel 10 may be provided with a so-called "powder screen" 64, through which the conduit end portion 40 projects, and extending entirely across the vessel. If the force of the moving gas should tend to carry the crystallized contents out of the vessel 10 along with the air and into the conduit 41, the screen 64 will stop such particles and allow the air alone or the air with its moisture content to pass through the screen and on to the vessel 17.

As will now be clear, after the process has continued for a time, nothing will be left in the vessel 1 except the solid matter of the natural orange juice; and the vessel 10 will contain, in crystal form, all of the volatile constituents of the original orange juice and the vessel 17 will contain the water content. To produce therefore an orange juice concentrate containing all of the natural constituents except the water which gave it bulk, it is only necessary to mix the final content of the vessels 1 and 10. And this may be done by drawing off the contents into separate receptacles and then mixing them. A conduit 65 discharges from the vessel 1, under control of a valve 66 into a receptacle 67. The vessel 10 discharges by a conduit 68 under the control of a valve 69 into a receptacle 70. By this means the contents of the vessels may be drawn off into the receptacles 67 and 70 and either kept separate for future mixing or immediately mixed, and the result is an exceedingly small volume concentrate of the original juice; and it follows that to again make natural beverage orange juice therefrom, it is only necessary to mix therewith the necessary bulk of water.

Since an inert gaseous medium such as nitrogen is employed and since no other outside agent is present and since the constituents are not subject to temperatures which change their chemical construction, it follows that the concentrate has precisely the same composition as the original juice except for the absence of water; and therefore, when restored to its natural bulk by the addition of water, will have the same taste, odor and all other characteristics of the original juice.

To aid in removing the contents of the vessel 10 which normally is in the form of frozen crystals, the refrigerant may be raised in temperature and relatively heat the coils 11—11 to melt down the frozen deposits into liquid form.

Obviously the water deposit in the vessel 17 at the end of the process may be drawn off through a conduit 71 controlled by a valve 72 into a receptacle 73, and if desired, this vessel may be warmed to melt the water if frozen by raising the temperature of the refrigerant in the coils 18—18.

If desired, other coils around the vessels 10 and 17 may be provided to supply heat to them from the source 4 but this has not been shown as it is believed that it will be understood without further illustration or description.

When the system is left charged with a selected gas, as above described, the gas may be used over and over, inasmuch as none of it is lost in the process described.

If it be desired to remove as much as possible of the moisture from the contents in the vessel 1, the final residue thereof may become so viscous as not to flow out of the conduit 65, that is to say, it may become so nearly dry that when allowed to cool, it will solidify or harden. In some cases, therefore, it may be desirable to mix with the material in the vessel 1, the liquid contents of the vessel 10. To this end, the vessel 10 may be drained into the receptacle 70 and then this receptacle may be substituted at the end of the conduit 57 for the vessel 58 and the contents pumped by means of the pump 55 into the vessel 1 and therein mixed, by the flow of gas, with the substantially moisture-less contents. Coordinate therewith the temperature of the vessel 1 may be lowered to a point at which there will be substantially no passage over of vapor material and after the contents have thus been mixed and liquefied sufficiently to flow out of the conduit 65, they may be discharged therefrom. If during this process, any material has again deposited in the vessel 10, it may be taken out into the receptacle 70 and mixed with the contents which are now in the receptacle 67.

Thus a very dry, substantially solid concentrate results, having no water moisture therein and consisting only of the solid matter, the acids and oils of the original juice.

It is to be understood that the showing in Fig. 1 is diagrammatic and illustrates the process rather than the structural elements of the apparatus performing it. The vessels 1, 10 and 17 may be of great size. The parts with which the original juice and the analyzed constituents thereof come into contact, may be such materials as will not react chemically therewith, such for example as glass, enamel, metal alloy, etc. The pump 31 is illustrated conventionally, and is not intended to represent the particular type of pump which would be used inasmuch as the most appropriate form and construction of pump for any case will be known to those skilled in this art. The source of hot fluid and the source of refrigerant for circulating through the conduits may be any suitable source regulated to temperature in any suitable manner all of which is well known.

In some cases, the arrangement illustrated in Fig. 2 may be employed to introduce the original juice into the vessel 1 which in this case is indicated at 1A. A container 74 is mounted above the vessel 1A and the original liquid is contained therein and is discharged into the vessel 1A by operation of a valve 75 leading from the vessel 74 into the vessel 1A. This method may be employed when the pressure of the circulating medium is normally substantially at atmospheric pressure and when the vessel 74 may be located sufficiently high above the vessel 1A for the liquid therefrom to flow into the vessel, raising the pressure therein as above described.

As will now be apparent, the method above described may be used to make a concentrate of many foods and other substances which have bulk because of a constituent, for example, such as water. And in every case, no constituent is lost nor changed in chemical property by the process. Of course, if the original material has in it components which require for their separation out, different degrees of temperature, high or low, any necessary number of vessels such as 10, 17, etc., may be provided in the system through all of which the circulating medium will flow.

In one aspect of the invention, therefore, it comprises a continuously circulating medium which passes through the original substance and carries off from it some of the components thereof, and by condensation, crystallization, etc., accomplished at successive points along the path of the medium, it is caused to give up the said components. The making of a concentrate, therefore, such as food concentrate consists in analyzing the original substance into its components, one of which may be water and then putting them together again omitting the water.

From this, it will also be apparent that the process above described may be utilized as an analytical process only. For example, it might be desired to extract from the orange juice, the acids and essential oils therein which can be done by simply withdrawing them into the receptacle 70, the other constituents being considered as waste.

Obviously, other concentrates other than food concentrates may be produced by the process as will become more apparent from a consideration of the process in its more general aspects hereinafter.

The pump 31 can be operated by hand if the capacity of the system is not too large.

In Fig. 3 is illustrated diagrammatically an apparatus by which a coffee beverage concentrate may be made from which potable beverage coffee may subsequently be produced by adding water to the concentrate.

The various elements of apparatus in Fig. 3 will be described in connection with the mode of operation which follows and which is simplified in view of the more complete description in connection with the form of Fig. 1.

Although the process may be started up in various ways, as will appear later, the preferred procedure is to first make a quantity of beverage coffee by any well known means apart from the apparatus illustrated, and to place the same in a receptacle 100. This initial quantity needs to be made only once, although the process generally may be practiced over and over. A suitably strong solution of this beverage coffee will be made by adding 500 grains of finely ground coffee bean of good quality to 1000 cubic centimeters of boiling water, and, after filtering, adding another 1000 cubic centimeters of boiling water to the filtered ground coffee. This will give approximately 1600 cubic centimeters of liquid beverage coffee to be placed in the container 100.

A pump 101 is then operated. This pump may be of any suitable construction, operated by hand or power but in the diagrammatic illustration comprises a piston 102 reciprocable in a cylinder 103. Upon withdrawing the piston 102, suction is created in a conduit 104 projecting downwardly into the receptacle 100 and controlled by a valve 105. The coffee in the receptacle 100 is drawn into the cylinder 103 flowing past and opening a check valve 106. The piston 102 is then reciprocated in the return direction and the check valve 106 closes and a check valve 107 in a conduit 108 is opened and the coffee is forced upwardly through the conduit 108 and out at a depending end portion 109 thereof which projects into the upper end of a vessel 110.

Within the vessel 110 is suspended a fabric or other bag 111 upon which is supported a quantity of freshly ground coffee bean 112. Above the bag 111 is a deflector 113 having perforations therein. The coffee thus discharged from the conduit portion 109 flows downwardly through the deflector 113 upon the ground coffee 112 and passing therethrough, extracts constituents from the ground coffee and deposits them in the bottom of the vessel as at 114. The liquid 114 may be designated as "super coffee" inasmuch as it not only contains the constituents of the original coffee made and placed in the receptacle 100 but also the constituents which were extracted from the ground coffee 112 on its passage therethrough.

A pump 115 is now operated. This pump likewise may be of any suitable form and operated manually or by power but in the diagrammatic showing comprises a piston 116 reciprocable in a cylinder 117. When the piston 116 is withdrawn, it opens a check valve 118 controlling a conduit 119 which communicates at one end with the cylinder and at the other end with a lower portion of the vessel 110 and draws into the cylinder 117 the super coffee liquid. When the piston 116 is reciprocated in the return direction, it closes the check valve 118 and opens a check valve 120 in a conduit 121, communicating with the lower part of a vessel 122 and forces the super coffee liquid thereinto.

At 123 is a pump which pumps a circulating medium through the system more fully to be identified. In this case, the medium is a gas and preferably an oxygen free gas, such as nitrogen or carbon dioxide. The gas is pumped from the pump 123 upwardly through a conduit 124, which enters the side of the vessel 122 and terminates in a downwardly extending conduit portion 125, adjacent the bottom of the vessel 122 and therefore near the bottom of the super coffee liquid 126 therein.

The gas flows upwardly through the liquid and out of the vessel by way of a conduit 127.

The vessel 122 is preferably heated by coils 128 through which hot liquid may be circulated by any suitable means such as the source of hot liquid indicated at 129 which supplies hot liquid through the coils 128 by conduits 130 and 131 controlled by valves 132 and 133.

The liquid 126 may be heated before the circulation of the gaseous medium is started so that when it begins to circulate therethrough, it will carry over into the conduit 127 water vapor, acids, essential oils, etc., comprising the volatile constituents of the liquid 126.

The conduit 127 terminates in a downwardly projecting portion 134, projecting into the vessel 110 so that the hot vapors discharging therefrom, pass downwardly through the deflector 113 and through the ground coffee 112, extracting coffee components therefrom. The vessel 110 may be maintained at a suitable temperature by coils 135 supplied by heat from the source of hot fluids 129 so that the super coffee liquid 114 thus produced in the vessel 110 will remain liquid. It will be observed that this super coffee liquid is produced by the mixing of the volatile parts carried over from the liquid 126 in the vessel 122 with components extracted thereby from the ground coffee 112.

Above the liquid 114 in the vessel 110 will be water vapor and volatile coffee components and these will pass over out of the vessel 110 by a conduit 136 which terminates in a downwardly extending portion 137 projecting into a vessel 138. Volatile components discharged out of the conduit portion 137 will condense in the vessel 138 and to this end the temperature of the vessel 138 may be lowered by coils 139 surrounding the vessel and supplied with refrigerating medium through conduits 140 and 141 controlled respectively by valves 142 and 143 and connected to a suitable source of refrigerant 144.

The source of the refrigerant may comprise means to regulate the temperature of the medium supplied thereby to the conduits 140 and 141 as was described in connection with refrigerator coils in Fig. 1.

I have found that the water vapor which is carried as above described, from the liquid coffee will condense at a lower temperature than the other volatile components thereof. Therefore, in the vessel 138 will collect liquid as at 139 comprising the volatile components with the exception of the moisture which will be carried in the form of water vapor out of the vessel 138 by a conduit 145 and discharged into a vessel 146 by a descending portion 147 of the conduit 145 projecting downwardly into the vessel. The vessel 146 is provided with cooling coils 148 supplied with refrigerant from the conduits 140 and 141, and the vapor in the vessel 146 is thereby chilled to the point at which the moisture precipitates out and collects in the vessel 146 at 149.

The gas thus freed from all of the components, and relatively dry, is drawn back out of the vessel 146 by way of a conduit 150 to the other side of the pump 123 and if preferred, a device at 151 may be provided to remove from the gas any remaining particles of moisture or other foreign substances before entering the pump 123, a drain valve 152 being provided, by which the contents may from time to time be drawn off, as more fully described in connection with the form of Fig. 1.

The water at 149 in the vessel 146 is allowed to remain and collect there. The collection of volatile components at 139 in the vessel 132, is, however, put back into the system by the pump 101. To this end the valve 105 of the conduit 104 is closed and a valve 153 in the line of a conduit 154 communicating with the liquid 139 is opened, and the pump 101 is operated to pump the liquid 139 from the vessel 138 along the conduit 154 and up through the conduits 108—109 and discharge it again down through the ground coffee 112 and into the lower part of the vessel 110, whence, by means of the pump 115, this liquid is again pumped into the vessel 122 to join with the liquid 126.

After this process has gone on for some time by circulating the medium through the parts of the apparatus by the pump 123, and by controlling the temperature of the various parts thereof as described, all of the water vapor will be at 149 in the vessel 146 (except for small quantities thereof which may collect in the device).

Each time that the liquid 139 is pumped back into the vessel 110 and the liquid 114 is pumped into the vessel 122, it makes the liquid 126 in the vessel 122 a "super coffee" mixture. But the circulation of the medium again picks up the excess of the volatile components including water vapor and deposits them again in the vessels 110, 138 and 146, leaving at 126 in the vessel 127, normal coffee minus water vapor. As the process goes on, the normal coffee 126 in the vessel 127, gives up more and more of the water components thereof without any substantial change otherwise in the composition thereof; and hence it becomes more and more concentrated and ultimately becomes a thick, viscous substance which may be drawn off from the bottom of the vessel 122 through a conduit 155 under the control of a valve 156 into a receptacle 157 in which, when the temperature falls to a normal temperature, it becomes substantially a solid which can, by manufacturing processes, be cut into pieces or tablets, each of such size that when dissolved in a cup of hot water will make a cup of potable beverage coffee. And inasmuch as none of the components except water have been permanently removed from the original coffee liquid, the beverage made from such a tablet will have all the characteristics, such as taste, odor, etc., of freshly made coffee.

If desired, and while the final concentrate is in liquid form, it may have mixed therewith sugar, preferably starch free sugar; or if desired, also, a concentrate of cream or milk may be added in such quantities that for each said tablet the proportion of the same will be suitable for a cup of beverage coffee.

Such milk or cream concentrate may be made by the process described in connection with Fig. 1 in which nothing is removed but the water content and at such temperature that the taste and other characteristics of the milk will remain unchanged.

When the coffee grounds at 112 in the vessel 110 have yielded all of the beverage making components thereof, the grounds may be discarded and replaced by a new quantity whereby the process may continue.

To render it easy to remove the used grounds 112, the principle embodied in the diagrammatic showing of Fig. 3 for the vessel 110 may be utilized. The upper part 156 of the vessel 110 is made removable, being in the nature of a lid on the lower part, and the screen 111 and the baffle 113 rests at their peripheries upon a shoulder 157 on the upper part of the vessel 110. At the time of removing the upper part 156, a valve 158 in the conduit 136, and valves 159 and 160 in the conduits 108 and 127 respectively are first closed and then, by means of couplings 161 and 162 between the valves 159—160 and the vessel portion 156, are operated to open the conduits and the end portions 134 and 109 of the conduits together with the upper portion 156 may be removed to give access to the baffle and screen to remove the coffee grounds.

If desired, the lower part of the vessel 110 in which the liquid 114 collects, may be kept cool by coils 163 connected to the source of refrigerant 144 by conduits 164 and 165 controlled by valves 166 and 167.

To charge the system with the gaseous medium, the air may first be exhausted out of the system as described in connection with Fig. 1 by closing a valve 168 adjacent to the pump and opening valves 169 and 170 and closing a valve 171, to be referred to. The contents of this system will then be exhausted out through a nozzle 172 and after this has been completed, the valve 170 may be closed and the valve 171 may be opened, which controls a conduit 173 leading to a tank of gas 174 whereby the gas will be drawn into the system and then the valves 171 and 169 may again be closed and the valve 168 opened, whereupon the pump will circulate the said gas through the system, as described.

As stated in connection with Fig. 1, the structural elements of Fig. 3 are diagrammatic only and those skilled in the art will know how to make and construct actual apparatus to perform the actions described above.

In Fig. 4, is illustrated diagrammatically an apparatus which may be employed to perform the process of my invention more generally. The description thereof is given herein more simply in view of the descriptions of the forms of Figs. 1, 2 and 3.

The apparatus comprises vessels, 201, 202 and 203 coils 204, 205 and 206 therefor respectively. To determine the temperature thereof, sources of circulating fluid 207 and 208 are provided from which fluid may be circulated through the coils to change the temperatures of the vessels. The vessels have discharge conduits 210, 211 and 212 by which the contents of the vessels respectively may be discharged into receptacles 213, 214 and 215. Pumps are provided, 216, 217 and 218 by which the contents of receptacles 219, 220 and 221 may be pumped into the vessels respectively through conduits 222, 223 and 224.

A pump 225 pumps the circulating medium into a conduit 226 and thence by a conduit portion 227 into the vessel 201; and thence by conduit 228 into the vessel 202 by a conduit portion 229; and from the vessel 202 by a conduit 230 and a conduit portion 231 into the vessel 203, and thence it is pumped by a conduit 232 through a device 233 for extracting foreign substances therefrom and by a conduit 234 back to the pump.

Any desired number of vessels 201, 202, 203 may be provided, each equipped as above described, if desired; and it will be observed that in general, the medium circulated by the pump 225 through material in either of the vessels 201 or 202 will carry part of it over into the vessels 202 and 203; and that all of the parts of the material in any one of the vessels may be withdrawn into the receptacles 213, 214 and 215; and that at any time during the process, materials can be injected into any one of the vessels from the receptacles 219, 220 and 221; and that the material withdrawn from one vessel into a receptacle such as 214 may be injected into another vessel, for example by transferring it to the receptacle 219 and injecting into the vessel 201 by the pump 216.

While in the two foregoing more completely described illustrative processes of Figs. 1 and 3, I have described the medium as a gas, the medium may, in fact, be itself a liquid or vapor. Likewise, while I have in the preceding examples described the material in the vessels as liquid, the material may, in fact, be liquid, solid or gaseous. So that in general, the gaseous medium may be used with either gaseous, liquid or solid materials in the vessels, and a liquid medium may be used with gaseous, liquid or solid materials in the vessels.

The gaseous mediums may be charged into the system from a tank 235, as described more fully in connection with the other forms. Liquid mediums may be introduced at the nozzle 236.

Additional gaseous substances or liquid substances may be introduced into the system at any point therealong, for example gaseous material may be introduced from a tank 237 by a conduit 238 to the conduit 228 at a point between the vessels 201 and 202. And similarly, liquids may be introduced from a vessel 239 by means of a pump 240 into the conduit 238. The pump 240 may be like either of the pumps 216, 217 or 218 or may be a power operated rotary pump.

As to some of the specific uses to which this more generalized system may be applied, there are the two specific illustrations given hereinbefore of actions resulting from the circulation of a gas through a liquid. This group of actions is, of course, very large including both organic and inorganic materials. Besides the two illustrative organic cases given, namely concentration of orange juice and coffee liquid, there are, of course, the other foods, such as tomato juice, lemon juice, soups, milk etc., and in the organic group may be mentioned the concentration of sodium chloride out of a water solution and potassium chloride out of an alcohol solution and other inorganic materials out of other solvents.

There is also included in this group the hydrogenation of liquid fats.

As illustrative of the use of a liquid medium with solid material may be mentioned the extraction of cocaine and atropine from the leaves of the plants. As will be apparent, the solvent in liquid form can be pumped through the succession of vessels at any desired temperature, thus speeding up the process and the process is more thorough since the solvent is continuously moving and continuously carrying out of the solid material the essence. This is a marked improvement over the present processes in which leaves or nuts are placed in a vessel and alcohol added and allowed to stand.

Furthermore since the process is sealed, the alcohol, when used as a solvent, is not lost because it cannot evaporate into the atmosphere. In this way besides the medicinal extracts mentioned, there may be derived the oils of rose, menthol, spearmint, citrus, cinnamon, etc., from parts of the plant or the fruits thereof, etc.

While the contact of the medium with the material will, in many cases, be effected by causing the medium to flow through the material as was described in connection with Figs. 1 and 3, and as indicated for Fig. 4, it may be desirable or necessary to cause the circulating medium to contact only with the surface of the material in the vessel or vessels. To this end, referring to Fig. 4, the conduit portion 227 in the vessel 201 may extend horizontally thereinto as indicated in dotted line at 227A and the conduit portion 229 in the vessel 202 may extend thereinto horizontally as indicated in dotted line at 229A and also as indicated at 231A for the conduit portion 231 of the vessel 203.

And in Fig. 1, the gas may be projected into the vessel 1 by a conduit portion 38A extending thereinto at the side, etc.

The direction of the conduit portions referred to and illustrated in dotted lines may be such as to cause the medium to impinge upon the surface of material in the vessel or merely to flow through vapors, gases, etc., which have risen out of the material and which are disposed in the vessel above the liquid or solid material therein.

Herein I have mentioned a few of the actions which can be performed and it will be apparent that the process may be practiced in the experimental derivation of other substances and in the performing of actions which have not heretofore been effected and therefore the process of my invention may be applied experimentally in research work in organic and inorganic chemistry, bio-chemistry, etc.

My invention therefore is comprehensive of all "actions" including the use of a gaseous medium with gaseous, liquid or solid material; the use of a liquid medium with gaseous liquid or solid material; and the use of a solid medium with gaseous, liquid or solid material, in the latter case the solid medium being in a form in which it will flow under the impulsion of a pump or the like whether or not it is suspended in a liquid or gas.

It will therefore be apparent that my invention is not limited to the particular actions illustrated and described or referred to hereinbefore but is inclusive of any and all actions which possibly can be performed by the operative process set forth in the appended claims.

My invention is not limited, in the practice thereof, to the employment of vessels, for example, the vessels 1, 10 and 17 of Fig. 1, of any par-

I claim:

1. The process of making coffee beverage concentrate which includes circulating a gaseous medium in a closed sealed path including a series of vessels connected by conduits, disposing in one vessel a quantity of coffee liquid and directing the medium to flow in contact therewith and to carry therefrom components thereof including volatile material and water vapor, leaving behind secondary coffee liquid, disposing in a second vessel in the path of the component carrying medium a quantity of fresh coffee grounds and directing the component carrying medium to flow therethrough and extract primary coffee liquid therefrom, accumulating the primary coffee liquid in said succeeding vessel and directing the medium to flow away from the accumulating primary coffee liquid and to carry therewith volatile compounds including water vapor, condensing the volatile components out of the medium in a succeeding vessel and accumulating them therein and condensing the water vapor out of the medium in another succeeding vessel, returning the medium to its starting point and continuously repeatedly circulating it through the said path, periodically discharging the accumulated volatile components through the said coffee grounds and then mingling them with the said primary coffee liquid, periodically mingling the said primary coffee liquid with the secondary coffee liquid, thereby causing it to have excess volatile components, whereby the excess volatile components and substantially all of the water constituent of the secondary coffee liquid are all ultimately removed and severally accumulated, leaving the secondary coffee liquid with substantially the greater part of the water content removed therefrom and with substantially a normal proportion of volatile components.

2. The process of making coffee beverage concentrate which includes circulating a gaseous medium in a closed sealed path including a series of vessels connected by conduits, disposing in one vessel a quantity of coffee liquid and directing the medium to flow in contact therewith and to carry therefrom components thereof including volatile material and water vapor, leaving behind secondary coffee liquid, disposing in a second vessel in the path of the component carrying medium a quantity of fresh coffee grounds and directing the component carrying medium to flow therethrough and extract primary coffee liquid therefrom, accumulating the primary coffee liquid in said second vessel and directing the medium to flow away from the accumulating primary coffee liquid and to carry therewith volatile compounds including water vapor, condensing the volatile components out of the medium in a succeeding vessel and accumulating them therein and condensing the water vapor out of the medium in another succeeding vessel, returning the medium to its starting point and continuously repeatedly circulating it through the said path, periodically mingling the said primary coffee liquid and accumulated volatile components with the secondary coffee liquid, thereby causing it to have excess volatile components, whereby the excess volatile components and substantially all of the water constituent of the secondary coffee liquid are all ultimately removed and severally accumulated, leaving the secondary coffee liquid with substantially the greater part of the water content removed therefrom and with substantially a normal proportion of volatile components.

3. The process of making a concentrate from solid volatile-containing material which includes circulating a gaseous medium in a closed sealed path including a series of vessels connected by conduits, disposing in one vessel a quantity of liquid containing volatiles derived from some of the solid material, and directing the medium to flow in contact therewith and to carry therefrom components thereof including volatile material and water vapor, leaving behind secondary liquid, disposing in a second vessel in the path of the component carrying medium a quantity of fresh solid material and directing the component carrying medium to flow therethrough and extract primary liquid therefrom, accumulating the primary liquid in said second vessel and directing the liquid to flow away from the accumulating primary liquid and to carry therewith volatile components including water vapor, condensing the volatile components out of the medium in a succeeding vessel and accumulating them therein and condensing the water vapor out of the medium in another succeeding vessel, returning the medium to its starting point and continuously, repeatedly circulating it through the said path, periodically discharging the accumulated volatile components through the said solid material and then mingling them with the said primary liquid, periodically mingling the said primary liquid with the secondary liquid thereby causing it to have excess volatile components, whereby the excess volatile components and substantially all of the water constituents of the secondary liquid are all ultimately removed from the secondary liquid and severally accumulated, leaving the secondary liquid with substantially the greater part of the water content removed therefrom and with substantially a normal proportion of volatile components.

4. The process of making a concentrate from solid volatile-containing material which includes circulating a gaseous medium in a closed sealed path including a series of vessels connected by conduits, disposing in one vessel a quantity of liquid containing volatiles derived from some of the solid material, and directing the medium to flow in contact therewith and to carry therefrom components thereof including volatile material and water vapor, leaving behind secondary liquid, disposing in a second vessel in the path of the component carrying medium a quantity of fresh solid material and directing the component carrying medium to flow therethrough and extract primary liquid therefrom, accumulating the primary liquid in said second vessel and directing the liquid to flow away from the accumulating primary liquid and to carry therewith volatile components including water vapor, condensing the volatile components out of the medium in a succeeding vessel and accumulating them therein and condensing the water vapor out of the medium in another succeeding vessel, returning the medium to its starting point and continuously, repeatedly circulating it through the said path, periodically mingling the said primary liquid with the secondary liquid thereby causing it to have excess volatile components, whereby the excess volatile components and substantially all of the water constituents of the secondary liquid are all ultimately removed from the secondary liquid and severally accumulated, leaving the secondary liquid with substantially the greater part of the water content removed therefrom and with substantially a normal proportion of volatile components.

5. The process of making coffee beverage concentrate which includes circulating a gaseous medium in a closed gas conduit path including a vessel, disposing in the vessel a quantity of secondary coffee liquid containing excess volatile components and water, directing the medium to flow in contact therewith and to carry therefrom components thereof including volatile material and water vapor, condensing the volatile components and water out of the medium at a point beyond the vessel, returning the medium to its starting point and continuously repeatedly circulating it through said path whereby the excess volatile components and substantially all of the water constituent of the secondary coffee liquid are all utimately removed leaving primary coffee liquid with substantially the greater part of the water content removed therefrom and with substantially a normal proportion of volatile components.

FRANK J. HORVATH.